F. A. CIGOL AND L. D. VILLA.
METHOD OF PAINTING RUBBER BALLS AND THE LIKE.
APPLICATION FILED MAR. 8, 1921.
1,420,306. Patented June 20, 1922.
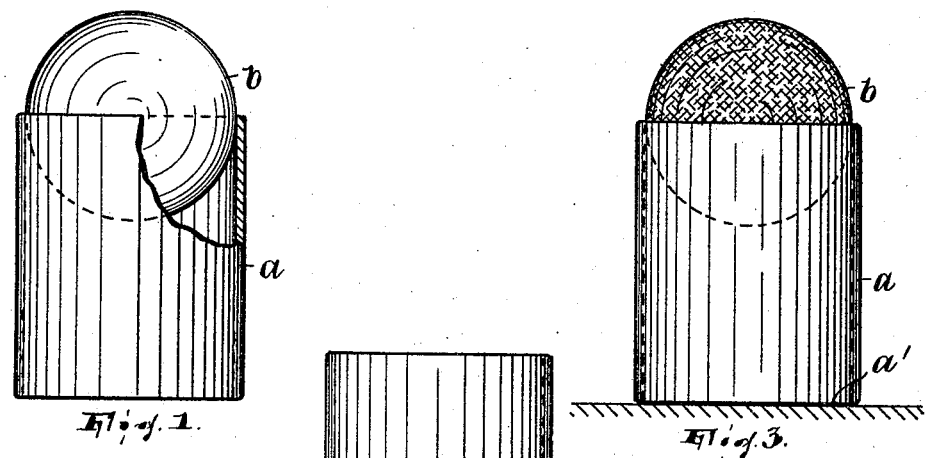
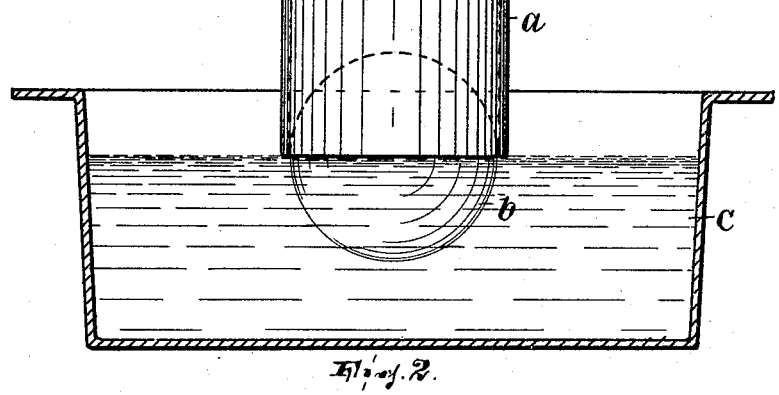
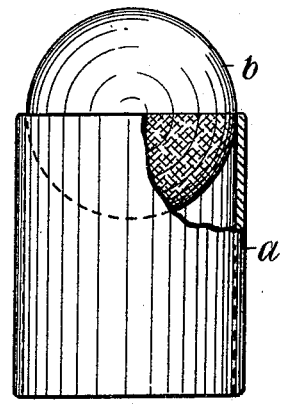
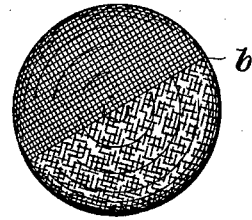
WITNESS:
INVENTORS,
Frank A. Cigol,
and Ludwig Dalla Villa,
ATTORNEY.

UNITED STATES PATENT OFFICE.

FRANK A. CIGOL AND LUDWIG DALLA VILLA, OF PATERSON, NEW JERSEY.

METHOD OF PAINTING RUBBER BALLS AND THE LIKE.

1,420,306.

Specification of Letters Patent.   Patented June 20, 1922.

Application filed March 8, 1921.   Serial No. 450,721.

*To all whom it may concern:*

Be it known that we, FRANK A. CIGOL and LUDWIG DALLA VILLA, citizens of the United States, residing at Paterson, in the county of Passaic and State of New Jersey, have invented certain new and useful Improvements in Methods of Painting Rubber Balls and the like, of which the following is a specification.

The present method of applying partial fluent coats, as of paint, to rotund objects, as for instance rubber balls, is a very tedious one, especially where one part is to have one treatment (as a given color) and the remainder another (as another color) and it is desired that the margins of the surface-portions treated should meet nicely, without undue overlapping or spacing. In partial coating of rubber balls, for example, the work is done by applying the coating material, as paint, with a brush, and it requires no little dexterity and skill to apply the coat exactly up to a given line, as the equatorial line, and not beyond or short of it; besides, care must be taken that the object, if the coat thus applied is a paint coat, is then placed and kept, until dry, so that such coat is not touched by other objects.

The invention contemplates a novel method of applying partial coats to rotund objects, such as balls, which will eliminate the skill and dexterity required by the present method and which will make it possible to do the work with a very considerable saving of time and with greater exactitude than heretofore.

In the drawing,

Figure 1 shows a ball that is to be given a partial coat arranged in a socket member which we employ in the performance of our method;

Figure 2 shows the ball and socket member inverted, the ball being held submerged in a paint bath for so much thereof as is exposed by the socket member;

Figure 3 shows the ball and socket member resting upright on a suitable supporting surface to permit the coat applied as in Figure 2 to dry;

Figure 4 shows the ball and socket member as in Figure 1 or 2, but with the position of the ball in the socket member reversed, ready to have its now exposed surface treated to a bath, as in Figure 2; and Figure 5 shows the ball as finally coated with opposite hemispherical portions thereof different colors.

We shall describe our method with reference to a rotund body in the form of a rubber ball which is to be coated on two hemispheres thereof in different colors.

A socket member $a$ is provided which, the object to be treated in the present case being spherical, is tubular; in fact, the device forming the socket may be and preferably is a short section of tubing having both ends cut to a right angle to its axis.

Into this socket, which is of a size to fit the ball $b$, snugly, is placed the ball, the ball being forced in in the present example up to its equatorial line; a seal will be formed between the socket and the ball all around especially as the ball is elastic and yielding.

A bath $c$ of liquid paint or other fluent coating material having been prepared the assembled ball and socket, inverted, are dipped therein to a depth sufficient to bring the mouth or then lower edge of the socket into contact with the bath. Of course, the coating of the portion of the ball which is left exposed by the socket may be accomplished in some other way, the advantage of employing the socket being that it serves to delineate exactly the margin of the part of the surface coated on account of the seal which it forms around the ball.

The ball and socket are then removed from the bath and the socket, which serves as a holder for the ball throughout the treatment is then employed to support the ball out of contact with other objects, as by the socket resting on a shelf or table on its base $a'$ (Figure 3), until the coating dries.

When the coating has dried the ball is removed from the socket and reinserted thereinto in substantially exactly reverse position (Figure 4), i. e., so that the as yet uncoated hemisphere will now be exposed.

The assembled ball and socket, inverted, are now dipped again into a bath, such as $c$, but of a color different from that of the first bath and to a depth sufficient to bring the mouth of the socket into contact with the bath. This coating step may also be accomplished in some other way than by immersion in a bath.

The ball and socket are then removed from the bath and the socket used again to support the ball until it dries out of contact with other objects, as in Figure 3.

The ball having two hemispheres painted different colors by our method and without spacing or overlapping of the painting coats is shown in Figure 5.

Having thus fully described our invention, what we claim as new and desire to secure by Letters Patent is:—

The hereindescribed method of applying fluent coats to the opposite parts of a rotund body which consists in introducing the body into a socket member which will then form a circumferential seal therearound, then, using the socket member as a holder, applying a coat to the part of said body left exposed by said member and up to the line of the seal, thereafter removing the body from the holder and introducing it again thereinto in substantially exactly reversed position and so as again to form a seal there around, and then applying another coat to the part of said body thereupon left exposed by said member and also up to said seal.

In testimony whereof we affix our signatures.

FRANK A. CIGOL.
LUDWIG DALLA VILLA.